(12) United States Patent
Maeda et al.

(10) Patent No.: US 7,734,757 B2
(45) Date of Patent: Jun. 8, 2010

(54) METHOD AND SYSTEM FOR MANAGING SHARED INFORMATION

(75) Inventors: Wakako Maeda, Tokyo (JP); Akio Tajima, Tokyo (JP); Seigo Takahashi, Tokyo (JP); Akihiro Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 221 days.

(21) Appl. No.: 12/000,471

(22) Filed: Dec. 13, 2007

(65) Prior Publication Data

US 2008/0147820 A1 Jun. 19, 2008

(30) Foreign Application Priority Data

Dec. 19, 2006 (JP) ............................. 2006-340750

(51) Int. Cl.
*G06F 15/173* (2006.01)
(52) U.S. Cl. ..................... 709/223; 709/229; 713/171; 380/277; 726/18
(58) Field of Classification Search ................. 709/223, 709/229; 713/171, 182; 726/18; 380/277
See application file for complete search history.

(56) References Cited

U.S. PATENT DOCUMENTS

| | | | | |
|---|---|---|---|---|
| 6,233,686 | B1 * | 5/2001 | Zenchelsky et al. | 726/1 |
| 7,181,620 | B1 * | 2/2007 | Hur | 713/171 |
| 7,386,878 | B2 * | 6/2008 | Fernando et al. | 726/3 |
| 2003/0016821 | A1 | 1/2003 | Hammersmith | |
| 2003/0026429 | A1 | 2/2003 | Hammersmith | |
| 2003/0026431 | A1 | 2/2003 | Hammersmith | |
| 2007/0058815 | A1 * | 3/2007 | Kwak et al. | 380/286 |

FOREIGN PATENT DOCUMENTS

JP 2004-501532 A 1/2004

OTHER PUBLICATIONS

C. H. Bennett et al., "Generalized Privacy Amplification," IEEE Transactions on Information Theory, vol. 41:6, Nov. 1995, pp. 1915-1923.
C. H. Bennett et al., "Quantum Cryptograph: Public Key Distribution and Coin Tossing," International Conference on Computers, Systems & Signal Processing, Dec. 10-12, 1984, p. 175-179.

* cited by examiner

*Primary Examiner*—Salad Abdullahi
(74) *Attorney, Agent, or Firm*—Foley & Lardner LLP

(57) ABSTRACT

A method and system for allowing communication devices to synchronously manage shared information are provided. A sender sends single-photon pulses modulated with original random numbers to a receiver and also sends frame pulses by using ordinary optical pulses. Bit comparison and basis reconciliation are performed by the frame which is defined by the frame pulses, whereby sifted keys, which are aggregated as a file, are generated by the sender and the receiver individually. The sifted keys are subjected to error correction, privacy amplification, and file sharing processing by the file, whereby common cryptographic keys are synchronously stored in the sender and the receiver individually. The generated cryptographic keys are managed as encryption keys and decryption keys separately. A newly generated key is preferentially placed in the encryption keys or decryption keys that have a smaller stored amount.

23 Claims, 7 Drawing Sheets

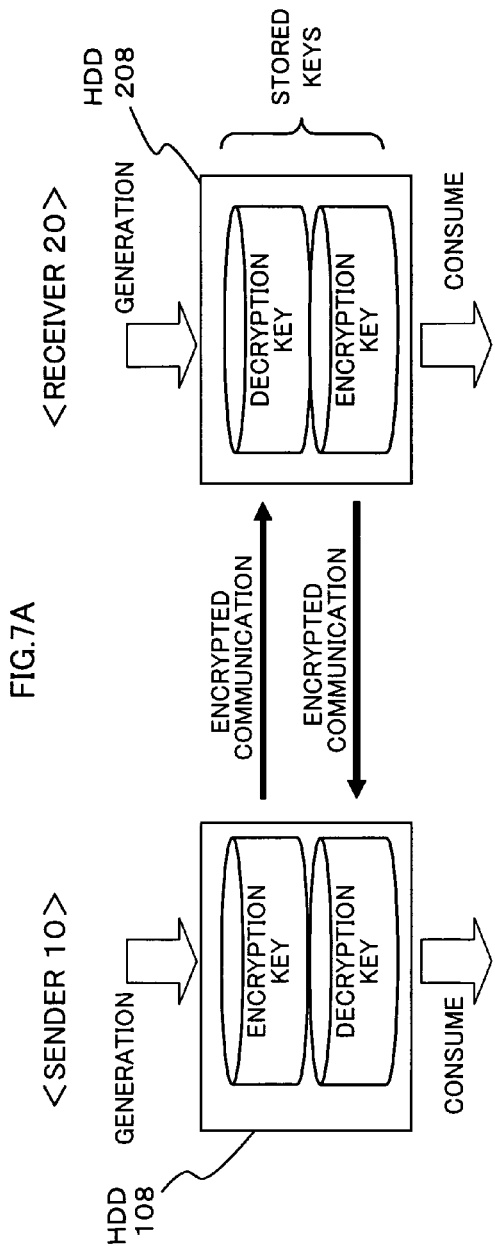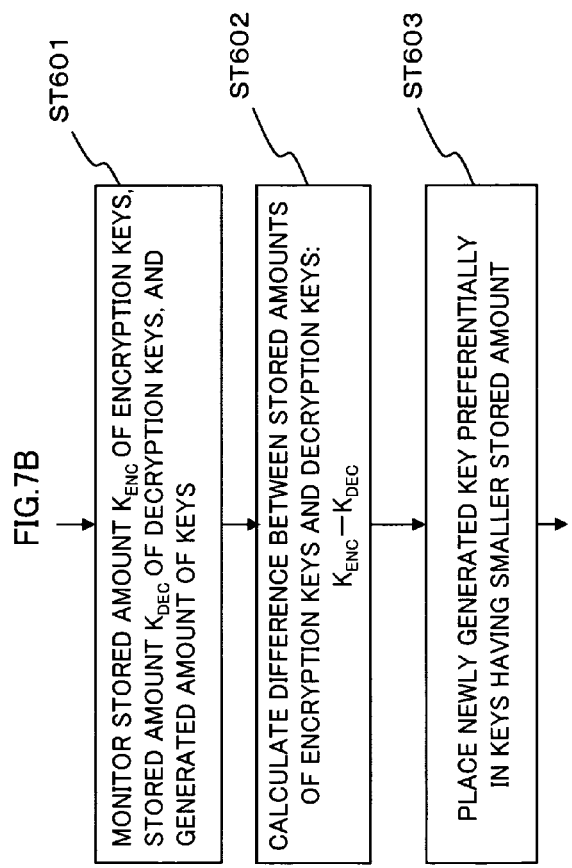

METHOD AND SYSTEM FOR MANAGING SHARED INFORMATION

BACKGROUND OF THE INVENTION

1. Field of the Invention

This application is based upon and claims the benefit of priority from Japanese Patent Application No. 2006-340750, filed on Dec. 19, 2006, the disclosure of which is incorporated herein in its entirety by reference.

The present invention relates to a method and system for managing information shared between communication devices.

2. Description of the Related Art

The Internet is an economic and social infrastructure over which various kinds of data are exchanged, and therefore it is an important issue to provide for preventive measures to protect the data flowing over the Internet from risks of eavesdropping. A secret communication system that encrypts data for communication can be cited as one of such preventive measures.

A key, which is required to encrypt and decrypt information, needs to be shared as secret information between a sending side and a receiving side. The quantum key distribution (QKD) technology is regarded as a promising technology for generating and sharing such secret information.

A. QKD

According to the QKD technology, unlike ordinary (classical) optical communications, random numbers are transmitted by using a single photon per bit, whereby a sending device and a receiving device can generate and share a common key. The QKD technology ensures security not based on the amount of calculation as in conventional cases but based on the principle of the quantum mechanics that a once-observed photon cannot be perfectly returned to its quantum state before observation.

According to the QKD technology, several steps should be gone through before a cryptographic key used for cryptographic communication is generated. A typical process of cryptographic key generation will be described below with reference to FIG. 1.

A.1) Single-Photon Transmission

In single-photon transmission, as mentioned above, random numbers are transmitted over a quantum channel by using very weak light in which the number of photons per bit is reduced to one. Among several QKD protocols proposed, for example, the BB84 protocol, which uses four quantum states, is widely known (see Bennett and Brassard, "QUANTUM CRYPTOGRAPHY, PUBLIC KEY DISTRIBUTION AND COIN TOSSING," IEEE International Conference on Computers, Systems, and Signal Processing, Bangalore, India, Dec. 10-12, 1984, pp. 175-179). A sender phase-modulates each single photon for transmission by using any one of four types of information obtained by the combination of two-valued random data (0, 1) and two bases (D, R) representing quantum states. A receiver receives each single photon by using any one of the bases (D, R) determined independently of the sender. A sequence of bits that have been successfully received by the receiver is called a raw key. Most of the random numbers sent by the sender are lost due to the loss along a transmission path and the like.

A.2) Basis Reconciliation

Next, bit comparison and basis reconciliation are performed using a communication channel of ordinary light (classical channel) that is different from the transmission path (quantum channel) used for the photon transmission. The receiver notifies the sender, through the classical channel, of the bit numbers of the successfully received bits and corresponding reception bases. The sender compares the received reception bases with transmission bases that were used to send bits corresponding to the received bit numbers, thereby sifting out only those bits corresponding to transmission and reception bases that have matched. A sequence of these sifted-out bits is called a sifted key.

A.3) Error Correction

Since there is a possibility that the sifted key thus generated may include communication errors, the random number sequence obtained by the sender and the random number sequence obtained by the receiver are not always identical to each other. Therefore, error correction processing is repeated until the sender's and receiver's sifted keys become identical. For a method for error correction processing, a BCH code, LDPC (Low-Density Parity Check) code, or the like can be used, which are also used in conventional communications.

A.4) Privacy Amplification

However, it cannot be affirmed that the errors corrected as described in A.3 are those caused only by the loss along the transmission path. The QKD technology always assumes an eavesdropper to be present. If an eavesdropper is present, it reflects on the error rate. Accordingly, to make an eavesdropping act ineffective, privacy amplification processing is performed on the identical sifted keys (for example, see Bennett, C. H., Brassard, G., Crepeau, C., and Maurer, U. M., "Generalized Privacy Amplification," IEEE Transactions on Information Theory, Vol. 41, No. 6, pp. 1915-1923). In the privacy amplification processing, the sifted key is given a shuffle by using another random numbers separately prepared. A key thus obtained finally by subjecting the error-corrected sifted key to the privacy amplification processing is called a final key.

As shown in FIG. 1, most of the original random numbers generated by the sender are lost in the course of single-photon transmission. In addition, the bits disclosed in the steps of basis reconciliation, error correction, and privacy amplification, as well as the bits used to eliminate the probability of eavesdropping, are also discarded from the raw key received by the receiver. For example, through the process of cryptographic key generation according to such QKD, several tens kilobits of a final key can be generated per second.

B. Encryption Method

In addition, it is possible to provide perfectly safe cryptographic communication by using the key generated by the QKD technology as a key for a one-time pad cipher, which is proved to be unbreakable. In the one-time pad encryption, a cryptographic key used by the sender for encryption must be always used by the receiver for decryption, and a cryptographic key used by the receiver for encryption must be always used by the sender for decryption. That is, the sender and the receiver need to determine in advance which of them will use a cryptographic key for which of encryption and decryption. Moreover, in the one-time pad encryption, since a key is discarded once it is used, a technique for managing key generation and consumption is important.

For example, Japanese Patent Unexamined Publication No. 2004-501532 discloses a technique for managing one-time pad keys. Here, a third party (central key provider) other than the sender and the receiver manages cryptographic keys in files. The central key provider encrypts a cryptographic key with an identifier assigned thereto and distributes it to each of the sender and the receiver. Moreover, a method of separately managing encryption keys and decryption keys in order to make associations between the encryption keys used for encryption and the decryption keys used for decryption is also disclosed.

Although the QKD technology includes various steps as shown in FIG. 1, cryptographic key data itself is sent and received only in the first step of single-photon transmission. In the subsequent steps, the cryptographic key data itself is not exchanged between the sender and the receiver although a fraction of the bits are disclosed. Accordingly, in the steps of basis reconciliation, error correction, and privacy amplification, the sender and the receiver independently perform computing and individually keep generating the respective versions of the final key moment by moment. However, in the process of key generation, the key generation rates of the sender and the receiver are not always the same for the reason that their throughputs are different, and the like. Further, since the sender and the receiver communicate with each other during key generation, a time lag in communication is also unignorable. Accordingly, the respective versions of the final key generated by the sender and the receiver independently of each other, as they are, cannot be used as a common key.

Moreover, in the one-time pad encryption, since a cryptographic key is discarded each time it is used, cryptographic keys are inevitably consumed. Accordingly, in the case where cryptographic keys generated and stored through the QKD technology are used as one-time pad keys, the amount of the stored keys is repeatedly increased and reduced. Therefore, it cannot be said that the sender and the receiver share always-matching stored keys. Furthermore, in the case where the stored keys are managed as encryption keys and decryption keys separately as described in the above-mentioned Publication No. 2004-501532, the consumption of the encryption keys differ from that of the decryption keys, depending on the direction of communication. Therefore, the problem arises that an encrypted communication cannot be performed when either the encryption keys or the decryption keys are used up. Additionally, in the system according to the above-mentioned Publication No. 2004-501532, a third party (central key provider) is needed to manage the cryptographic keys in files and distribute to each of the sender and the receiver.

SUMMARY OF THE INVENTION

Accordingly, an object of the present invention is to provide a method and system for managing shared information that enable communication devices to use identical information.

According to the present invention, shared information which is generated between first and second communication devices in a communication system is managed as follows: generating the shared information at each of the first and second communication devices; transmitting identifying information from the first communication device to the second communication device, wherein the identifying information identifies a piece of the shared information generated in the first communication device; making an association between same pieces of the shared information generated at respective ones of the first and second communication devices based on the identifying information; and storing associated pieces of the shared information at respective ones of the first and second communication devices.

According to the present invention, the shared information is managed such that the communication devices are enabled to use identical information.

BRIEF DESCRIPTION OF THE DRAWINGS

FIG. 5A shows a sequence of random number bits sent by a sender, and FIG. 5B shows a sequence of raw key bits received by a receiver and how their bit numbers are shifted.

FIG. 7A is a schematic diagram showing an image of the management of stored keys in HDDs according to the present exemplary embodiment.

FIG. 7B is a flow chart showing an example of final-key placement control performed by a key management section.

DETAILED DESCRIPTION OF THE PREFERRED EMBODIMENTS

Hereinafter, a quantum cryptographic system will be described as an application example of the present invention. However, the application of the present invention is not limited to this system, but the present invention can be applied to general systems in which a plurality of communication devices synchronously manages information so that the communication devices have identical information to be shared between them.

Figure 1:
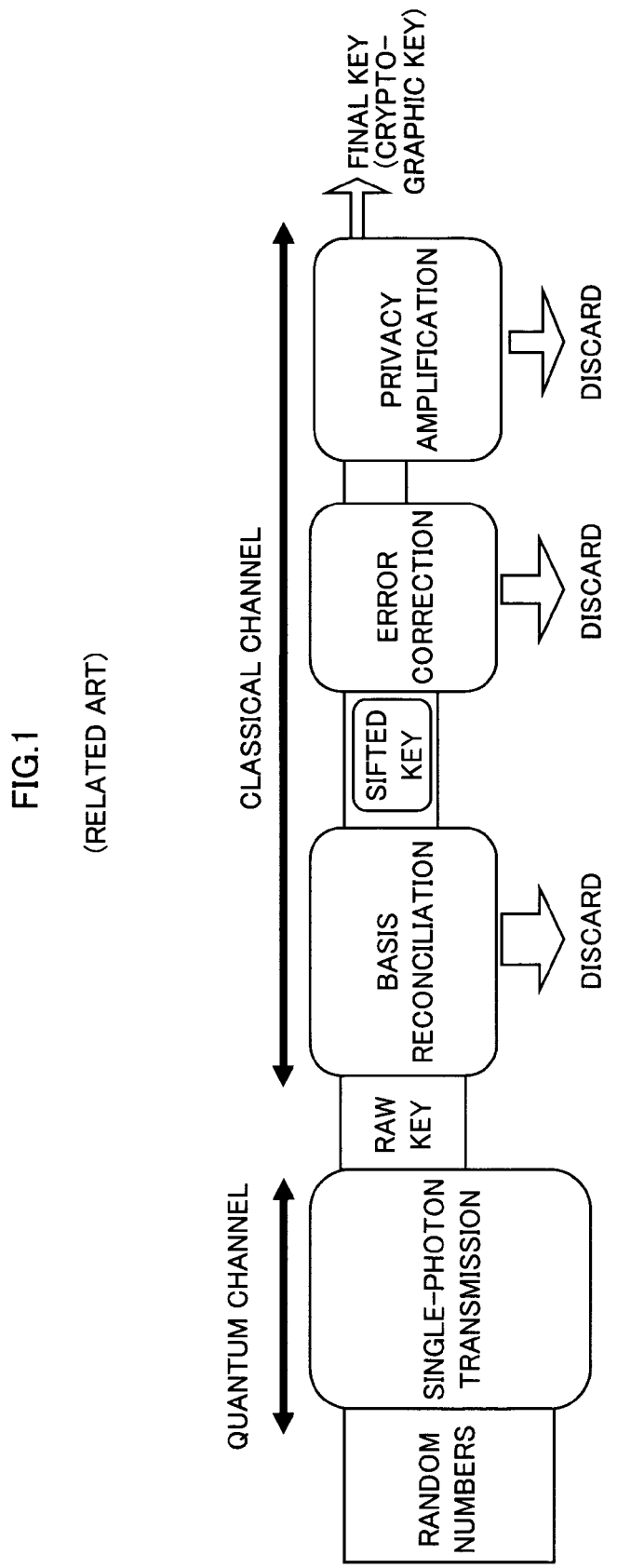
FIG. 1 is a flow chart showing a typical process of cryptographic key generation.
Figure 2:
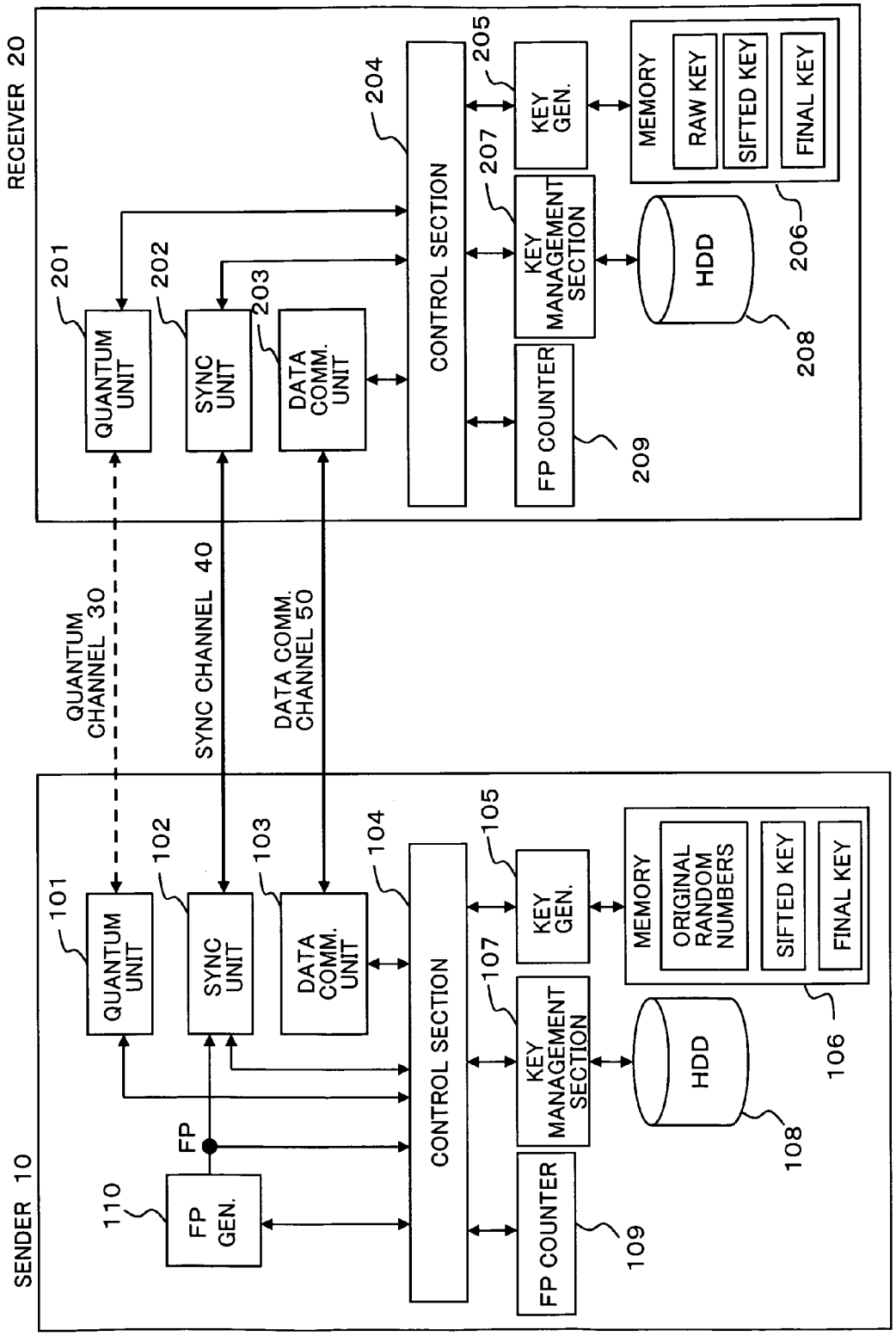
FIG. 2 is a block diagram of a quantum cryptographic system according to a first exemplary embodiment of the present invention.

FIG. 2 is a block diagram of a quantum cryptographic system according to a first exemplary embodiment of the present invention. Referring to FIG. 2, the quantum cryptographic system has a configuration in which a sender 10 and a receiver 20 are connected by a plurality of communication channels through an optical transmission medium. By way of example, the plurality of communication channels shown here are a quantum channel 30, a synchronization channel 40, and a data communication channel 50, which will be described later. The sender 10 is provided with a quantum unit 101, a synchronization unit 102, and a data communication unit 103, and the receiver 20 is provided with a quantum unit 201, a synchronization unit 202, and a data communication unit 203. The quantum unit 101 of the sender 10 and the quantum unit 201 of the receiver 20 are connected by the quantum channel 30. The synchronization unit 102 of the sender 10 and the synchronization unit 202 of the receiver 20 are connected by the synchronization channel 40. The data communication unit 103 of the sender 10 and the data communication unit 203 of the receiver 20 are connected by the data communication channel 50.

The quantum unit 101 of the sender 10 superimposes random number bit information on each very weak optical pulse, which is so weak as to include a single photon or fewer per bit, and transmits the pulses to the quantum unit 201 of the receiver 20 through the quantum channel 30. The quantum unit 201 detects the very weak optical signal that has successfully arrived, and stores raw key data.

In general, timing cannot be extracted from such very weak light. Therefore, the synchronization unit 102 of the sender 10 separately transmits timing information by using optical power at an ordinary level through the synchronization channel 40. In this event, it is preferable that the quantum channel 30 and the synchronization channel 40 be transmitted over the same optical transmission line (e.g., an optical fiber) by wavelength-division-multiplex (WDM) transmission so that the transmission condition of the quantum channel 30 and that of the synchronization channel 40 are as much the same as possible.

The data communication channel 50 may be set on the same optical transmission line as the quantum channel 30 and synchronization channel 40 by means of WDM when optical communication through the data communication channel 50 is performed by using optical power at an ordinary level. However, the data communication channel 50 can be set on another optical transmission line different from the line including the quantum channel 30 and synchronization channel 40, or may be set on an electrical communication line using an electrical signal.

The sender 10 further includes a control section 104, a key generation section 105, a memory 106, a key management section 107, and a storage device 108. The control section 104 controls key generation, key management and encrypted communication, which will be described later. The key generation section 105 carries out a process of key generation by using the memory 106. The key management section 107 stores a generated final key in the storage device 108 as an encryption key or a decryption key and manages stored keys. The memory 106 is a read/write memory and stores original random numbers, a sifted key, and a final key, which will be described later. The storage device 108 needs to be capable of safely storing encryption keys and decryption keys. It is assumed that a hard disk drive (HDD), which is a magnetic recording medium, is used here for the storage device 108.

The sender 10 still further includes a FP (Frame Pulse) counter 109 that counts frame pulses and a FP generator 110 that generates frame pulses. The FP generator 110 outputs a frame pulse to each of the synchronization unit 102 and the control section 104. The FP counter 109 counts the frame pulse and notifies a frame number to the control section 104. The synchronization unit 102 transmits the frame pulse to the receiver 20 through the synchronization channel 40. The key generation section 105 and the key management section 107 use the count value made by the FP counter 109 as an index when generating and managing a cryptographic key.

The control section 104, the key generation section 105, and the key management section 107 can be implemented by executing a control program, a key generation program, and a key management program, respectively, on a program-controlled processor such as, for example, CPU.

The receiver 20 further includes a control section 204, a key generation section 205, a memory 206, a key management section 207, and a storage device 208. The control section 204 controls key generation, key management, and encrypted communication, which will be described later. The key generation section 205 carries out a process of key generation by using the memory 206. The key management section 207 stores a generated final key in the storage device 208 as an encryption key or a decryption key and manages stored keys. The memory 206 is a read/write memory and stores a raw key, a sifted key, and a final key, which will be described later. The storage device 208 needs to be capable of safely storing encryption keys and decryption keys. It is assumed that a hard disk drive (HDD), which is a magnetic recording medium, is used here for the storage device 208.

The receiver 20 still further includes a FP (Frame Pulse) counter 209 that counts frame pulses. The FP counter 209 counts a frame pulse received from the sender 10 through the synchronization channel 40. The key generation section 205 and the key management section 207 use the count value made by the FP counter 209 as an index when generating and managing a cryptographic key.

The control section 204, the key generation section 205, and the key management section 207 can be implemented by executing a control program, a key generation program, and a key management program, respectively, on a program-controlled processor such as, for example, CPU.

It should be noted that a method for single-photon transmission used by the quantum units 101 and 201 is not limited to a particular one. For example, it can be a method of one-way type by which very weak optical pulses with random number information superimposed thereon by modulation are transmitted in one direction from the quantum unit 101 of the sender 10 to the quantum unit 201 of the receiver 20. Alternatively, a method of round-trip type may be employed by which optical pulses are sent from the quantum unit 201 of the receiver 20 to the sender 10 and returned by the quantum unit 101 of the sender 10, from which very weak optical pulses modulated with random number information are sent back to the quantum unit 201 of the receiver 20.

1. Process of Cryptographic Key Sharing

Figure 3:
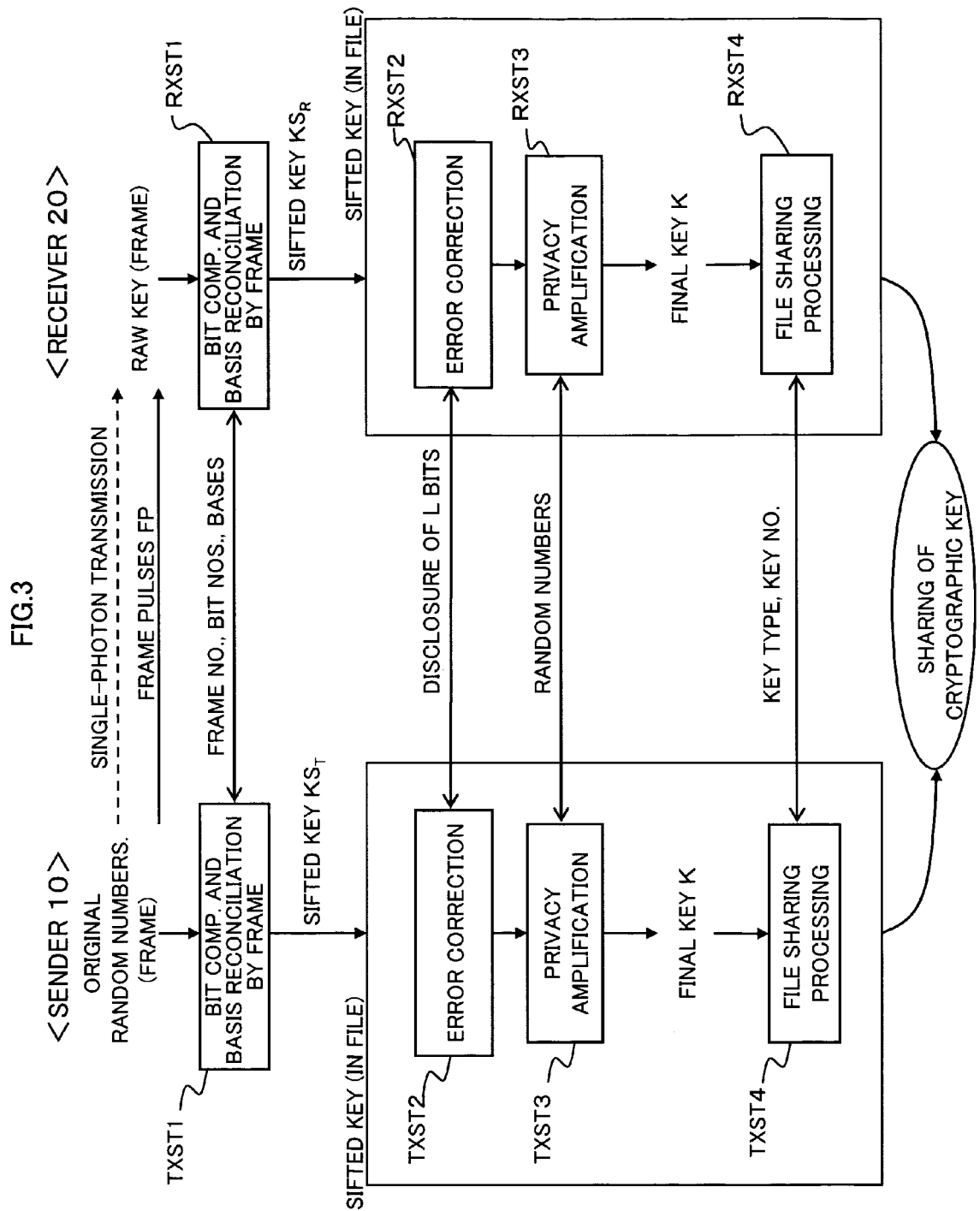
FIG. 3 is a schematic flow chart showing a method for generating a cryptographic key according to the present exemplary embodiment.

FIG. 3 is a schematic flow chart showing a method for generating a cryptographic key according to the present exemplary embodiment. As described already, in cryptographic key generation, basically performed are single-photon transmission, basis reconciliation, error correction, and privacy amplification. In the present exemplary embodiment, the single-photon transmission and basis reconciliation are performed by the frame, using a frame pulse as a reference. Sifted keys thus generated are aggregated as a file on a basis of a certain stored amount, and the error correction and privacy amplification are performed by the file.

<Single-Photon Transmission>

First, the sender 10 stores in the memory 106 original random numbers that are the source of a key, and also sends these original random numbers to the receiver 20 through the quantum channel 30 by using optical pulses including one photon or fewer per bit. Since most single photons are extinguished due to the loss along the transmission path, the receiver 20 receives only part of the original random numbers. The receiver 20 stores a sequence of the received bits as a raw key in the memory 206.

In this single-photon transmission, although data itself, which is the source of a key, is transmitted, its security can be ensured without leakage to a third party as described already. However, in the single-photon transmission, it is impossible to construct a data unit, such as a frame or a packet. This is because the transmitted bits are extinguished at random along the transmission path and therefore information cannot be transmitted by using a header.

Accordingly, the sender 10, in parallel with the single-photon transmission, generates frame pulses FP at the FP generator 110 and sends the frame pulses FP from the synchronization unit 102 to the receiver 20 through the synchronization channel 40. The frame pulses FP are generated, for example, at fixed intervals, enabling a sequence of single-photon pulses transmitted between a certain frame pulse $FP_{TX(i)}$ and next frame pulse $FP_{TX(i+1)}$ to be processed as one frame. Meanwhile, the FP counter 109 counts the number of the frame pulses $FP_{TX}$ that have been transmitted, and the key generation section 105 manages frame numbers #i based on the count value.

In the receiver 20, the quantum unit 201 receives the single-photon pulses through the quantum channel 30, and the synchronization unit 202 receives the frame pulses FP through the synchronization channel 40. In the receiver 20 as well, a sequence of single-photon pulses received between a received frame pulse $FP_{RX(i)}$ and next received frame pulse $FP_{RX(i+1)}$ can be processed as one frame. Meanwhile, the FP counter 209 counts the received frame pulses $FP_{RX}$, and the key generation section 205 manages frame numbers #i based on the count value. As described above, although it is impossible to construct a frame directly from the very weak optical pulses transmitted through the quantum channel 30, the transmission of the frame pulses FP at an ordinary optical level through the synchronization channel 40 makes it possible to construct a pseudo-frame, or a tentative frame.

However, the frame pulses FP only indicate an outline of (or a tentative index to) a frame structure. This is because the frame number and bit numbers of certain data on the sender side are not always the same as those on the receiver side. Specifically, in the case where the quantum channel 30 and the synchronization channel 40 are transmitted by means of WDM, since the wavelengths thereof are different from each other, their respective transmission speeds of light are different from each other even if the quantum channel 30 and the synchronization channel 40 are transmitted over the same transmission line. Therefore, even if the frame numbers are made to correspond to each other between the sender 10 and the receiver 20, it is not always true that data stored on the N-th bit of a frame with a frame number #i in the sender 10 is stored on the same N-th bit of a frame with the same frame number #i in the receiver 20. It is assumed here that data stored on the N-th bit of a frame with a frame number #i in the sender 10 is stored on the (N+n)-th bit of a frame with the frame number #i in the receiver 20.

<Bit Comparison and Basis Reconciliation>

Subsequently, the key generation section 105 of the sender 10 and the key generation section 205 of the receiver 20 perform bit comparison and basis reconciliation by the frame through the data communication channel 50 (TXST1, RXST1). That is, until bit comparison and basis reconciliation performed on a frame is complete, bit comparison and basis reconciliation will not be performed on the next frame. While referring to the FP counters 109 and 209, respectively, the key generation sections 105 and 205 control so that respective corresponding frames are subjected to bit comparison and frame reconciliation processing through the data communication units 103 and 203 and the data communication channel 50.

A sifted key $KS_T$ of the sender 10 and a sifted key $KS_R$ of the receiver 20 thus generated are extremely small in size, compared with the data size of a frame of original random numbers and the data size of a frame of raw key data. For example, an available sifted key generated from a 3.2-Mbyte frame is 20 kilobits long. Therefore, the bit comparison and basis reconciliation is repeated for each frame sequentially, and sifted-key data generated each time is accumulated. When the data becomes of a predetermined size, the accumulated sifted key data is aggregated as a file and stored along with a file number in each of the memories 106 and 206. For example, 20-kbit sifted key data is sequentially stored and accumulated. Each time the size of the accumulated data reaches 32 kilobytes, the accumulated data is aggregated as a file. Thus, sifted key files $KS_T$ and $KS_R$ are stored in the memories 106 and 206, respectively, each along with a file number. Here, a file is a block of data aggregated on a basis of a predetermined size.

In this manner, the sender 10 and the receiver 20 sequentially perform the bit comparison and basis reconciliation processing by the frame while monitoring the frame numbers, whereby the sender 10 and the receiver 20 can generate respective sifted keys and aggregate some sifted keys as a file synchronously with each other, that is, substantially simultaneously on a frame basis. The details of the bit comparison and basis reconciliation will be described later.

<Error Correction and Privacy Amplification>

When the sifted key files $KS_T$ and $KS_R$ have been generated, next performed are error correction processing (TXST2, RXST2) and privacy amplification processing (TXST3, RXST3). The error correction processing and privacy amplification processing are performed by the file. Until the processing on a file is complete, the processing on the next file will not be performed.

As mentioned earlier, since the sifted keys $KS_T$ and $KS_R$ in respective corresponding files might include communication errors, the sifted keys $KS_T$ and $KS_R$ are not always identical random number sequences. Therefore, the key generation sections 105 and 205 repeat the error correction processing using the data communication functionality through the data communication channel 50 until the sifted keys $KS_T$ and $KS_R$ in the respective corresponding files in question match each other (TXST2, RXST2). In this event, disclosed bits of the sifted keys $KS_T$ and $KS_R$ are discarded.

Thus, when all errors have been corrected and the sifted keys $KS_T$ and $KS_R$ have matched each other, the key generation sections 105 and 205 next perform the privacy amplification processing on the respective matching sifted keys KS in order to make an eavesdropping act ineffective (TXST3, RXST3). In the privacy amplification processing, each of the key generation sections 105 and 205 gives the sifted key KS a shuffle by using another random numbers separately prepared, thereby obtaining a final key K.

<File Sharing>

Subsequently, the key management sections 107 and 207 determine, by using the data communication functionality through the data communication channel 50, which of their respective final keys K in the respective files in question is assigned which type of use (encryption use/decryption use). Then, in accordance with the respective types of use, the final keys K are stored in the HDDs 108 and 208 respectively, each along with a file number (TXST4, RXST4).

In the above-described steps of error correction, privacy amplification, and file sharing, sequential processing is performed by the file, whereby final keys can be sequentially stored in each of the HDDs 108 and 208. Accordingly, the sender 10 and the receiver 20 can synchronously, that is, substantially simultaneously generate an encryption key and a decryption key that are identical on a file basis. The details of the error correction, privacy amplification, and file sharing processing will be described later.

2. Bit Comparison and Basis Reconciliation Processing

Figure 4:
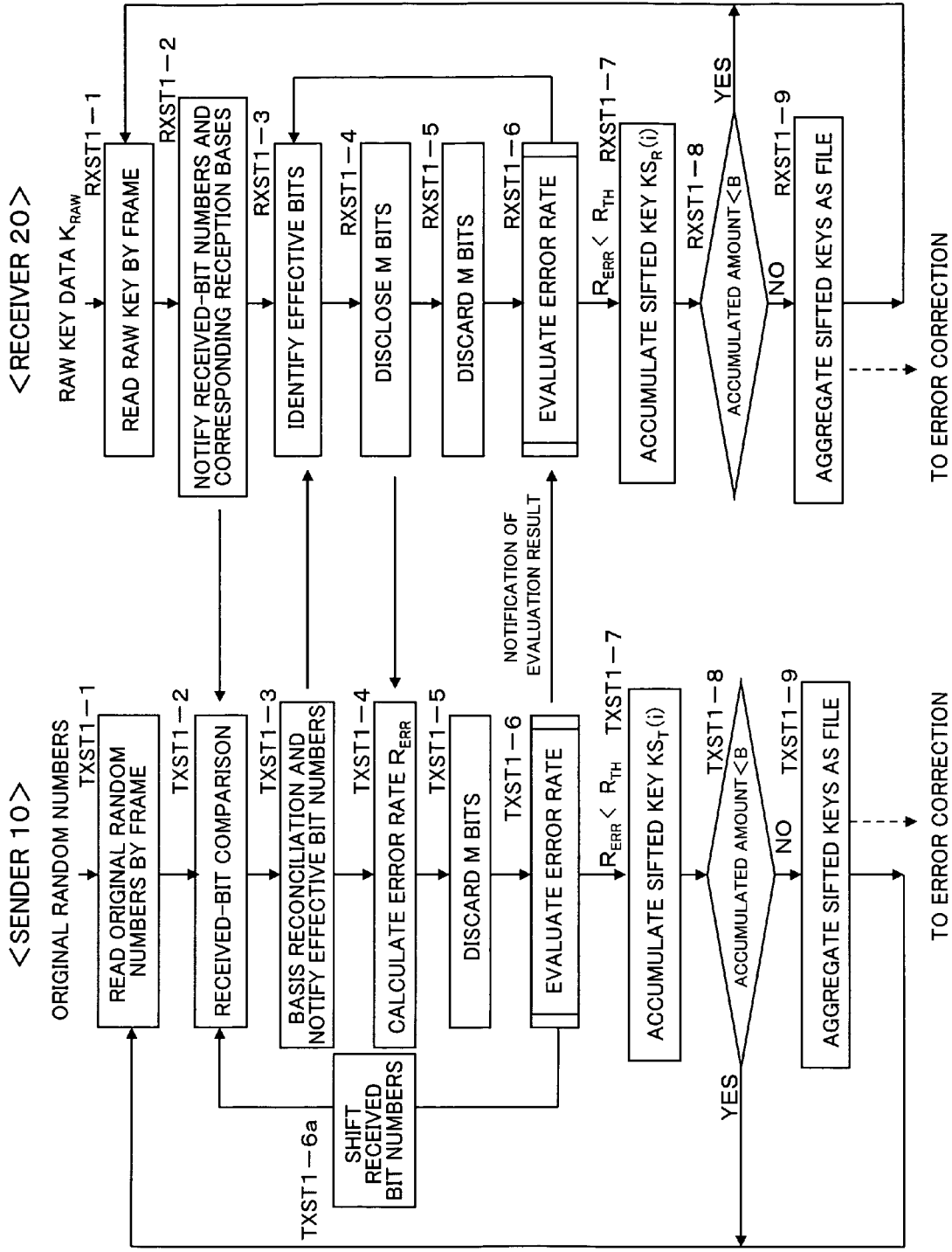
FIG. 4 is a flow chart showing a procedure for sharing a sifted key through bit comparison and basis reconciliation processing shown in FIG. 3.

FIG. 4 is a flow chart showing a procedure for sharing a sifted key through the bit comparison and basis reconciliation shown in FIG. 3. Here, shown are a procedure performed by the sender 10 and a procedure performed by the receiver 20, including data communications between the sender 10 and the receiver 20.

Referring to FIG. 4, in the receiver 20, raw key data $K_{RAW}$ is stored by the pseudo-frame in the memory 206 as described above. First, the key generation section 205 of the receiver 20 reads from the memory 206 one raw key in a frame #i that is currently the oldest (step RXST1-1), and notifies the sender 10, from the data communication unit 203 through the data communication channel 50, of the bit numbers of the bits of the raw key in this frame, reception bases used to receive these bits, and the frame number i of this frame (step RXST1-2).

In the sender 10, original random numbers are stored by the frame in the memory 106 as described above. The key generation section 105 of the sender 10 reads from the memory 106 one frame that is currently the oldest (TXST1-1), and identifies bits corresponding to the received bit numbers of the bits of the raw key, from among random numbers in the frame #i, which corresponds to the frame number i received from the receiver 20 (step TXST1-2). Further, the key generation section 105 compares transmission bases used to send the identified bits with the received reception bases and notifies the receiver 20, through the data communication channel 50, only of effective bit numbers corresponding to those bases that have matched (step TXST1-3).

The key generation section 205 of the receiver 20 identifies effective bits in the raw key, based on the effective bit numbers notified from the sender 10 (step RXST1-3). Subsequently, the key generation section 205 extracts M bits at random from the effective bits and notifies the sender 10, through the data communication channel 50, of the bits numbers of the M bits and corresponding raw key data (step RXST1-4). The bits disclosed when transmitted over the data communication channel 50 are discarded (step RXST1-5).

The key generation section 105 of the sender 10 compares the data disclosed by the receiver 20 with the effective bits maintained on its own side and calculates an error rate $R_{ERR}$ (step TXST1-4) Then, the key generation section 105 discards the bits used to calculate the error rate (step TXST1-5) and evaluates the error rate (step TXST1-6).

Here, if all errors are communication errors only, the error rate $R_{ERR}$ is approximately 10% at most. However, since the frame structure defined by reference to the frame pulses FP indicates only a frame outline as described above, the error rate may become approximately 50% when the sender 10 and the receiver 20 perform basis reconciliation by using non-correlating bits. Accordingly, a threshold value $R_{TH}$ is set at an appropriate value that is not smaller than 10%, whereby it can be determined whether or not the received bit numbers themselves are deviated. When the error rate $R_{ERR}$ is larger than the threshold value $R_{TH}$, the key generation section 105 shifts the received bit numbers by one bit (step TXST1-6a) and then reperforms the processing from the step of received-bit comparison (step TXST1-2) again. The received-bit-number shift and received-bit comparison will be described more specifically later with reference to FIG. 5.

While sequentially shifting the received bit numbers in this manner, the key generation section 105 searches for a place for the bit numbers where the error rate $R_{ERR}$ becomes smaller than the threshold value $R_{TH}$. When the error rate $R_{ERR}$ becomes smaller than the threshold value $R_{TH}$, the key generation section 105 sends notification to that effect to the receiver 20 and stores the then effective bits as a sifted key $KS_{T(i)}$ in the memory 106 (step TXST1-7). The key generation section 105 determines whether or not the accumulated amount of the sifted keys stored in the memory 106 has reached a predetermined size B (step TXST1-8). When the accumulated amount is short of the predetermined size B (YES in step TXST1-8), the key generation section 105 goes back to the step TXST1-1 and starts processing the next frame.

When the accumulated amount of the sifted keys has reached the predetermined size B (NO in step TXST1-8), the key generation section 105 aggregates the accumulated sifted keys as a file and stores the file along with a file number in the memory 106 (step TXST1-9). Then, the key generation section 105 goes back to the step TXST1-1 and starts processing the next frame. Thus, sifted keys aggregated as a file are sequentially stored in the memory 106.

On the other hand, in a step RXST1-6, the key generation section 205 of the receiver 20 receives the result of the error rate evaluation from the sender 10. When the error rate $R_{ERR}$ is larger than the threshold value $R_{TH}$, the key generation section 205 goes back to the step RXST1-3, where the key generation section 205 identifies effective bits in the raw key, based on effective bit numbers (shifted by one bit from the previous effective bit numbers) notified from the sender 10. The key generation section 205 repeats the above-described steps RXST1-3 to RXST1-5 until the error rate $R_{ERR}$ becomes smaller than the threshold value $R_{TH}$.

When the key generation section 205 is notified in the step RXST1-6 of an evaluation result to the effect that the error rate $R_{ERR}$ is smaller than the threshold value $R_{TH}$, the key generation section 205 stores the then effective bits as a sifted key $KS_{R(i)}$ in the memory 206 (step RXST1-7). The key generation section 205 determines whether or not the accumulated amount of the sifted keys stored in the memory 206 has reached the predetermined size B (step RXST1-8). When the accumulated amount is short of the predetermined size B (YES in step RXST1-8), the key generation section 205 goes back to the step RXST1-1 and starts processing the next frame.

When the accumulated amount of the sifted keys has reached the predetermined size B (NO in step RXST1-8), the key generation section 205 aggregates the accumulated sifted keys as a file and stores the file along with a file number in the memory 206 (step RXST1-9). Thereafter, the key generation section 205 goes back to the step RXST1-1 and starts processing the next frame. Thus, sifted keys aggregated as a file are sequentially stored in the memory 206.

In this manner, the bit comparison and basis reconciliation processing is sequentially performed by the frame while the frame numbers are monitored, whereby the sender 10 and the receiver 20 can sequentially generate sifted key files substantially at the same time.

EXAMPLE

Figure 5A:
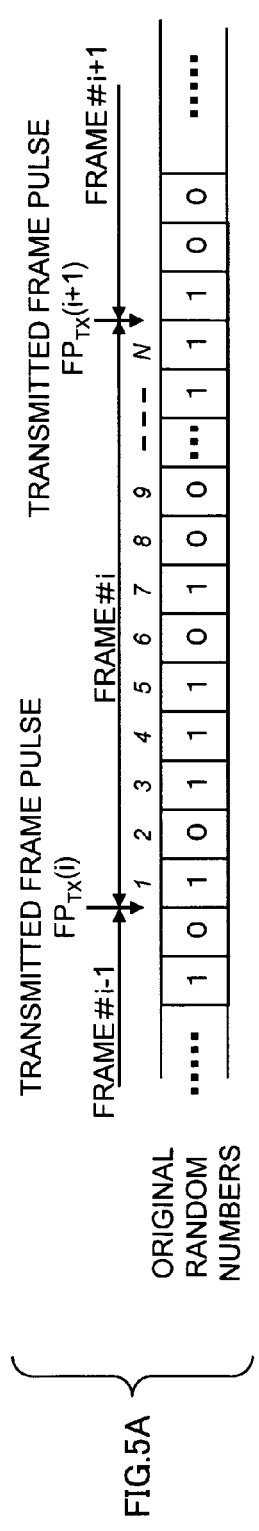
FIGS. 5A and 5B are schematic time charts to describe received-bit-number shift and received-bit comparison, where
Figure 5B:
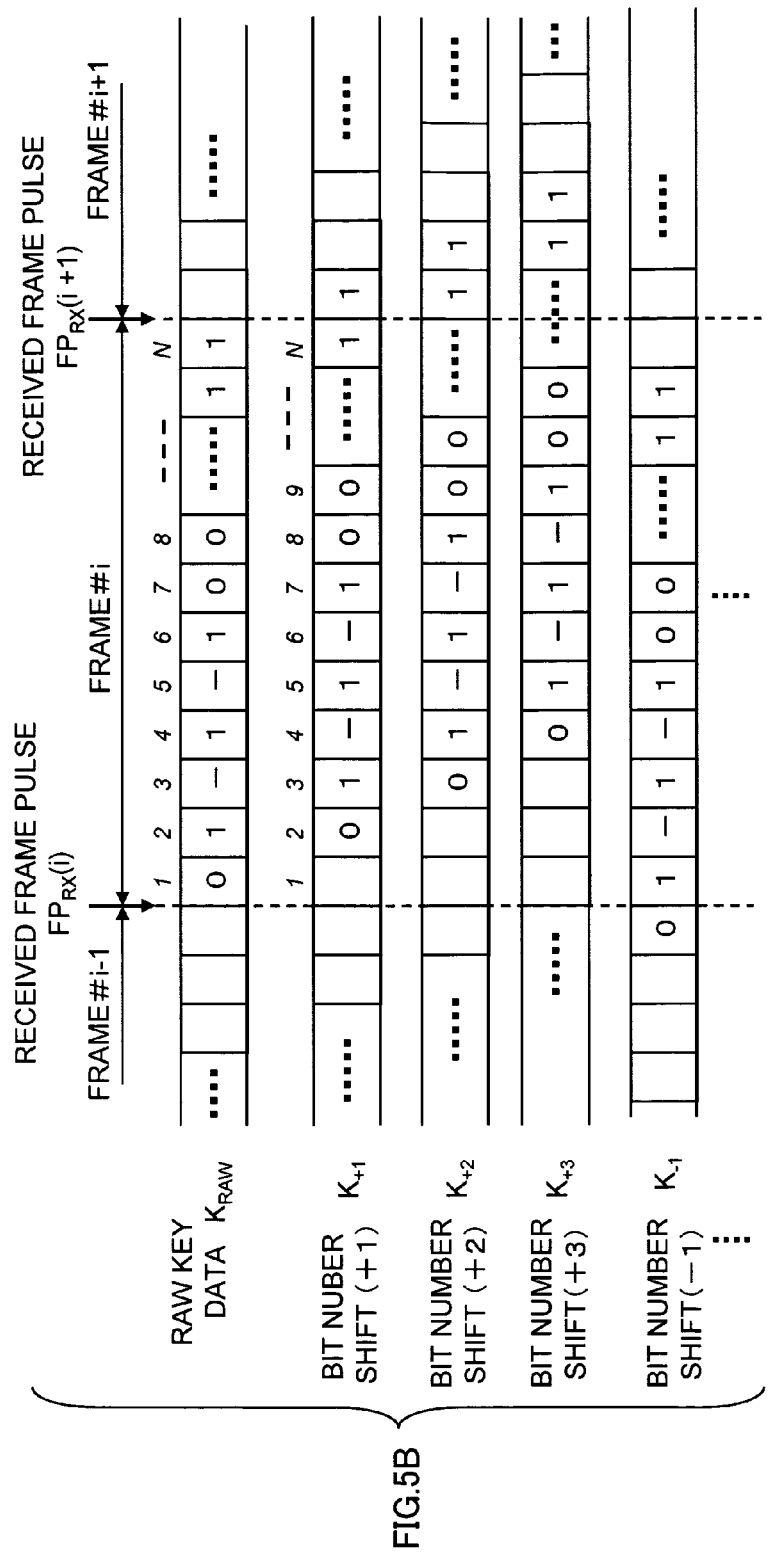

FIGS. 5A and 5B are schematic time charts to describe the received-bit-number shift and received-bit comparison, where FIG. 5A shows a sequence of original random number bits sent by the sender, and FIG. 5B shows a sequence of raw key bits received by the receiver and how the bit numbers of these bits are shifted. Here, for simplicity, it is assumed that N random numbers are transmitted in one frame, and that raw key data received on the receiver side is deviated by n, which is one bit here.

Referring to FIG. 5A, the sender 10 sends random numbers, which are the source of a key, to the receiver 20 through the quantum channel 30 and, in parallel with this, also sends frame pulses FP to the receiver 20 through the synchronization channel 40. Here, it is assumed that N bits of random numbers "101110100 . . . 1" are sent between a frame pulse $FP_{TX(i)}$ and next frame pulse $FP_{TX(i+1)}$ (in a frame with a frame number #i).

Referring to FIG. 5B, the receiver 20 receives part of the random numbers because some of a stream of single-photon pulses transmitted over the quantum channel 30 are extinguished in the course of transmission due to loss. The receiver 20 stores a sequence of the received bits as raw key data $K_{RAW}$ in the memory 206. Since the frame pulses FP transmitted over the synchronization channel 40 are a sequence of optical pulses at an ordinary optical level, timing can be reproduced from the frame pulses FP. Here, it is assumed that raw key data $K_{RAW}$ "01-1-100 . . . 1" has been received between a frame pulse $FP_{RX(i)}$ and next frame pulse $FP_{RX(i+1)}$ (in a frame with the frame number #i), and that a photon corresponding to a bit indicated by "–" in this raw key data $K_{RAW}$ "01-1-100 . . . 1" has not been able to be detected.

The receiver 20 notifies the sender 10 of the bit numbers 1, 2, 4, 6, . . . , N of the bits of the raw key, as well as reception basis information D/R corresponding to these bits and the frame number #i in question (step RXST1-2 in FIG. 4). In the sender 10, the sequence of bits "101110100 . . . 1" in the frame with the frame number #i, as shown in FIG. 5A, have been stored in the memory 106. The key generation section 105 of the sender 10 identifies bits "10-1-0100 . . . 1" corresponding to the bit numbers 1, 2, 4, 6, . . . , N of the bits of the raw key, received from the receiver 20 (step TXST1-2 in FIG. 4), and first compares transmission basis information corresponding to the identified bits with the reception basis information notified from the receiver 20. The sender 10 notifies the receiver 20 only of effective bit numbers corresponding to those bases that have matched (step TXST1-3 in FIG. 4). For example, assuming that bases corresponding to the bit numbers 1, 8, etc. have not matched, the sender 10 notifies the receiver 20 of the effective bit numbers 2, 4, 6, 7, . . . , N.

Upon receipt of the effective bit numbers 2, 4, 6, 7, N, the receiver 20 selects M bits at random from among the bits with these effective bit numbers and sends the bit numbers and data of the M bits to the sender 10 (step RXST1-4 in FIG. 4). Here, assuming that the data "–1-1-10- . . . 1-" of the M bits with the effective bit numbers 2, 4, 6, 7, . . . , (N-1) is sent to the sender 10 (step RXST1-4 in FIG. 4), the sender 10 compares the received data "–1-1-10- . . . 1-" of the M bits with original random numbers "–0-1-01- . . . 1-" corresponding to the received bit numbers of the M bits and calculates an error rate $R_{ERR}$ (step TXST1-4 in FIG. 4). In this case, since it is assumed that the raw key data $K_{RAW}$ is deviated from the original random numbers, the error rate $R_{ERR}$ must be as high as approximately 50%.

Accordingly, the key generation section 105 shifts the received bit numbers by one bit in one direction (+1) (step TXST1-6a in FIG. 4). The key generation section 105 compares the transmission basis information with reception basis information corresponding to these shifted received bit numbers, and notifies the receiver 20 only of effective bit numbers corresponding to those bases that have matched (step TXST1-3 in FIG. 4).

The receiver 20 identifies effective bits in the raw key, based on the new effective bit numbers notified from the sender 10 (step RXST1-3 in FIG. 4). The receiver 20 extracts M bits at random from among the effective bits and notifies them to the sender 10 (step RXST1-4 in FIG. 4). In this case, since the new effective bit numbers made by shifting the received bit numbers are notified, new raw key data $K_{+1}$ falling within the frame with the frame number #i in the receiver 20 is "*01-1-100 . . . 1" as shown in FIG. 5B. In this example, this new raw key data $K_{+1}$ matches the original random number bits shown in FIG. 5A. Since M bits are selected from this raw key data $K_{+1}$ and sent to the sender 10 and an error rate $R_{ERR}$ is calculated based on these M bits, the error rate $R_{ERR}$ must be lowered to 10% or smaller. In other cases of received-bit-number shift (+2, +3, –1, . . . ) as shown in FIG. 5B, since raw key data is deviated from the original random numbers, the error rate $R_{ERR}$ is as high as approximately 50%.

As described above, while sequentially shifting the received bit numbers, the key generation section 105 of the sender 10 stores the effective bits as a sifted key when the error rate $R_{ERR}$ is smaller than the threshold value. When the key generation section 205 of the receiver 20 has received from the sender 10 a notification that the error rate $R_{ERR}$ is smaller than the threshold value, the key generation section 205 stores the then effective bits as a sifted key. Sifted keys are stored and accumulated in this manner, and each time the accumulated amount of the sifted keys reaches a predetermined size B, the accumulated sifted keys are aggregated as a file. A sifted key file is thus sequentially stored in each of the memories 106 and 206.

In the example shown in FIG. 4, the key generation section 105 of the sender 10 performs the received-bit-number shift and searches for a place for the bit numbers where the error rate $R_{ERR}$ becomes smaller than the threshold value $R_{TH}$. However, the key generation section 205 of the receiver 20 may perform similar bit-number shift. In this case, however, when it is determined in the step RXST1-6 in FIG. 4 that the error rate $R_{ERR}$ is not smaller than the threshold value $R_{TH}$, the key generation section 205 shifts the bit numbers of the raw key by one bit and then goes back to the step RXST1-2 to notify the sender 10 of the new bit numbers and corresponding reception basis information. Moreover, the key generation section 205 notifies the sender 10 of a result of the evaluation in the step RXST1-6. The key generation section 105 of the sender 10 notified of the result of the evaluation goes back to the step TXST1-2 and receives the new bit numbers and corresponding reception basis information. The other processing is the same as described in FIG. 4.

3. Error Correction, Privacy Amplification, and File Sharing

Figure 6:
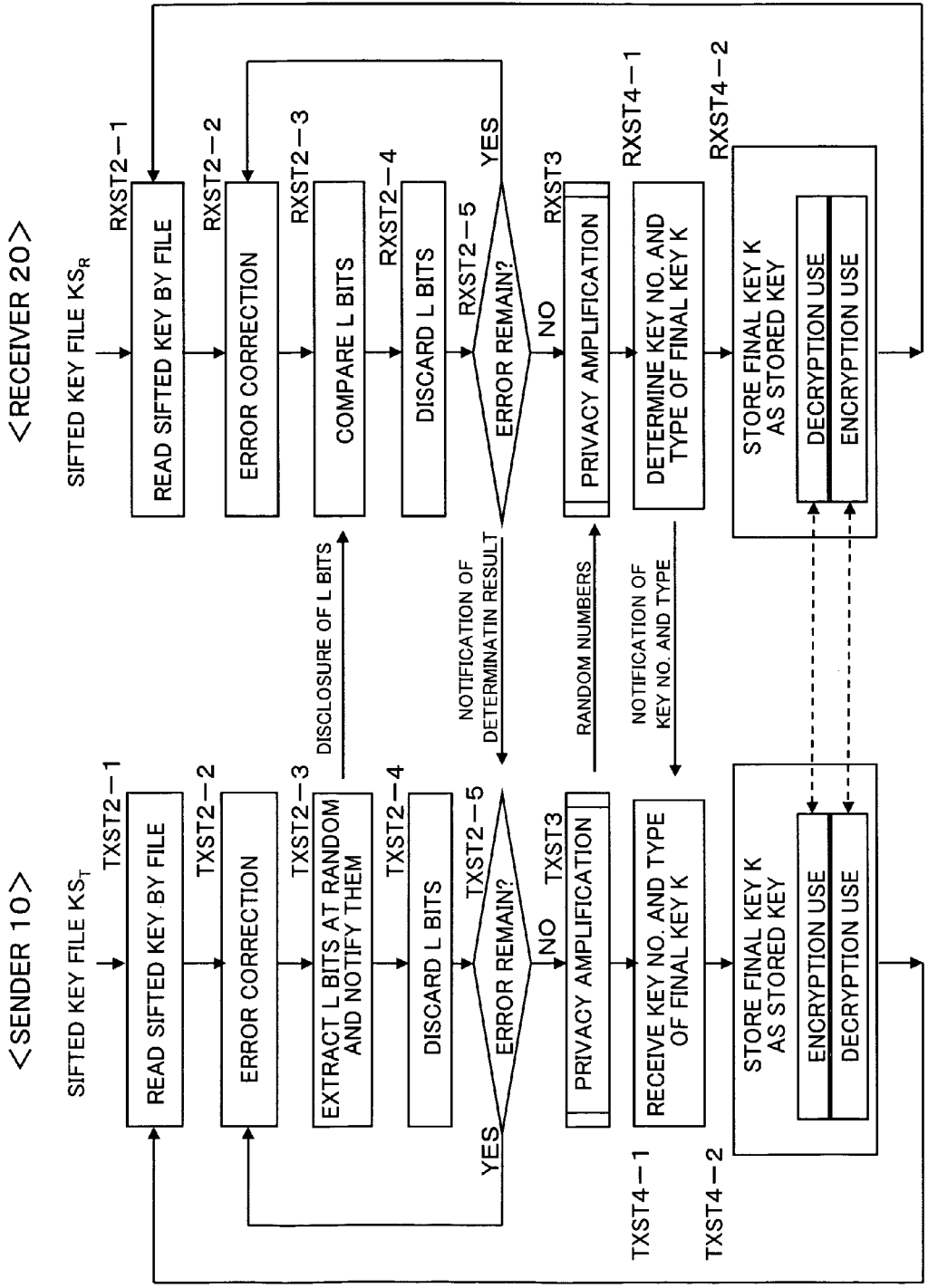
FIG. 6 is a flow chart showing a procedure for sharing a cryptographic key through error correction, privacy amplification, and file sharing processing shown in FIG. 3.

FIG. 6 is a flow chart showing a procedure for sharing a cryptographic key through the error correction, privacy amplification, and file sharing processing shown in FIG. 3. Here, shown are a procedure performed by the sender 10 and a procedure performed by the receiver 20, including data communications between the sender 10 and the receiver 20.

3.1) Error Correction Processing

First, in the receiver 20, sifted keys $KS_R$ are stored by the file in the memory 206. Since a sifted key at this stage includes communication errors, the sender 10 and the receiver 20 do not always have identical random number sequences. Accordingly, the key generation section 205 reads from the memory 206 a sifted key file $KS_R$ that is currently the oldest (step RXST2-1) and performs error correction (step RXST2-2). Similarly, in the sender 10, sifted keys $KS_T$ are stored by the file in the memory 106. The key generation section 105 reads from the memory 106 a sifted key file $KS_T$ that is currently the oldest (step TXST2-1) and performs error correction (step TXST2-2).

When the error correction is finished, the key generation section 105 extracts L bits at random from the error-corrected key data and sends the L bits along with their bit numbers to the receiver 20 through the data communication channel 50 (step TXST2-3). Since the key generation section 205 of the receiver 20 also has finished the error correction processing substantially at the same time, the key generation section 205 compares the L bits received from the sender 10 with the key data of corresponding L bits on its own side and calculates an error rate (step RXST2-3). After discarding the L bits used for the comparison (step RXST2-4), the key generation section 205 determines whether or not an error remains (step RXST2-5). When there is a remaining error, the key generation section 205 sends notification to that effect to the sender 10 and performs the error correction processing again (step RXST2-2).

Similarly in the sender 10, the key generation section 105 discards the L bits that have been disclosed (step TXST2-4) and then determines whether or not the notification that an error remains is received from the receiver 20 (step TXST2-5). If there is a remaining error, the key generation section 105 performs the error correction processing again (step TXST2-2).

In the sender 10 and the receiver 20, the error correction processing (steps TXST2-2 to TXST2-5, steps RXST2-2 to RXST2-5) is repeated until no error remains. Key data thus obtained is the data of random number sequences that have matched for the first time between the sender 10 and the receiver 20.

3.2) Privacy Amplification Processing

Next, the key generation section 205 of the receiver 20 performs the privacy amplification processing (step RXST3). In the privacy amplification processing, the key generation section 205 gives the error-corrected sifted key a shuffle by using random numbers separately prepared, thereby obtaining a final key K. Similarly in the sender 10, the key generation section 105 performs the privacy amplification processing (step TXST3), thereby obtaining a final key K. In the privacy amplification processing performed by the key generation sections 105 and 205 individually, the same privacy amplification processing algorithm is used. As described above, since the error-corrected sifted keys are identical random number data that have matched between the sender 10 and the receiver 20, the sender 10 and the receiver 20 must generate the identical final keys K when they perform the privacy amplification processing by using the same algorithm, even if independently of each other.

In the privacy amplification processing, the amount of information that has been leaked to an eavesdropper is estimated, and part of each error-corrected sifted key is discarded during shuffle. Accordingly, the final keys K generated through the error correction and privacy amplification processing have a reduced data size, compared with the sifted key files $KS_T$ and $KS_R$.

In this manner, the final keys K are synchronously generated by the sender 10 and the receiver 20 substantially at the same time and are respectively stored in the memories 106 and 206. At this time, although the sender 10 and the receiver 20 generate the final keys K independently of each other, it is ensured, by undergoing the above-described procedures, that the final keys K are random number sequences that are identical to each other.

3.3) File Sharing Processing

Next, through the file sharing processing, an association, as a pair of an encryption key and a decryption key, is made between the final keys K generated by the sender 10 and the receiver 20 through the above-described procedures. This is because, in an encryption scheme like the above-described one-time pad encryption, when the sending side performs encryption by using a random number sequence K, the receiving side needs to perform decryption by using the same random number sequence K. Here, the file sharing processing (or file synchronization processing) refers to the processing for sequentially making an association between the final keys K generated by the sender 10 and the receiver 20 independently of each other.

First, the key management section 207 of the receiver 20 determines a number and a type (encryption use/decryption use) to be assigned to the generated final key K (RXST4-1) and stores the final key K in the HDD 208 (RXST4-2). The encryption key/decryption key stored in the HDD 208 is called a stored key. Moreover, the key management section 207 notifies the sender 10, through the data communication channel 50, of the number and type of the final key K. A method for determining the number and type of the final key K will be described specifically in the next "Management of cryptographic keys." When the sharing processing on this final key K is finished, the process goes back to the step TXST2-1, and the next sifted key file is processed.

The key management section 107 of the sender 10 receives the number and type (encryption use/decryption use) of the generated final key K from the receiver 20 (TXST4-1) and stores the corresponding final key K as a stored key in the HDD 108 in accordance with the received number and type (TXST4-2). When the sharing processing on this final key K is finished, the process goes back to the step TXST2-1, and the next sifted key file is processed.

Through the file sharing processing as described above, the synchronously generated final keys K can be respectively stored in the sender 10 and the receiver 20, with an association as a pair of encryption and decryption keys being made therebetween. Accordingly, as in the case of one-time pad encryption for example, a cryptographic key used by the sender 10 for encryption can be always used by the receiver 20 for decryption, and a cryptographic key used by the receiver 20 for encryption can be always used by the sender 10 for decryption.

In the example shown in FIG. 6, the key management section 207 of the receiver 20 determines a number and a type (encryption use/decryption use) for the final key K and notifies them to the sender 10. However, it is also possible that the key management 107 of the sender 10 determines a number and a type (encryption use/decryption use) for the final key K and notifies them to the receiver 20.

4. Management of Cryptographic Keys

In a quantum cryptographic system, encrypted communications can be performed by using final keys thus generated and stored. Assuming that one-time pad encryption is used as an encryption scheme, a final key K is stored in the HDD 108 of the sender 10 as an encryption key, and an identical final key K is stored in the HDD 208 of the receiver 20 as a decryption key. In this case, the control section 104 of the sender 10 encrypts data for transmission by using the encryption key K stored in the HDD 108 and sends the encrypted data to the receiver 20 from the data communication unit 103 through the data communication channel 50. When the encrypted data is received by the data communication unit 203 of the receiver 20, the control section 204 decrypts the received data by using the decryption key K stored in the HDD 208.

In the one-time pad encryption, the cryptographic keys once used will never be used again and are discarded. Accordingly, the stored keys in the HDDs 108 and 208 are increased as keys are generated by the key generation sections 105 and 205, and are decreased as the stored keys are consumed in an encrypted communication. Accordingly, the stored amount of stored keys in the HDD 108 and the stored amount of stored keys in the HDD 208 individually repeat increase and decrease and therefore are not always identical to each other.

Moreover, in the one-time pad encryption, keys are always discarded. Therefore, the same key that is used by the sender 10 for encryption must be used by the receiver 20 for decryption. In reverse, the same key that is used by the receiver 20 for encryption must be used by the sender 10 for decryption. In other words, if the sender 10 and the receiver 20 simultaneously perform encryption processing, the receiver 20 cannot use a key paring up with a key used by the sender 10 for encryption, to encrypt other data. Accordingly, the stored keys in the HDD 108 and the stored keys in the HDD 208 need to be managed by the key management sections 107 and 207, respectively.

FIG. 7A is a schematic diagram showing an image of the management of the stored keys in the HDDs, according to the present exemplary embodiment. FIG. 7B is a flow chart showing an example of final-key placement control performed by the key management section. The stored keys in the HDD are managed as encryption keys and decryption keys separately.

First, the key management section 207 of the receiver 20 monitors the stored amount $K_{ENC}$ of the encryption keys and the stored amount $K_{DEC}$ of the decryption keys, each stored in the HDD 208, based on their respective generated amounts and consumed amounts, and also monitors the generated amount of keys generated through the above-described process of key generation (step ST601). When a new final key is generated as described above, the key management section 207 calculates a difference between the encryption and decryption keys at this point of time (step ST602) and places the new final key preferentially in the keys having the smaller stored amount (step ST603). Additionally, final keys are systematically numbered in order of generation and are stored in the HDD 208. The types (encryption use/decryption use) and key numbers of the final keys, which are determined by the key management section 207 of the receiver 20, are notified to the sender 10 through the data communication channel 50.

Similarly, the key management section 107 of the sender 10 also monitors the stored amount $K_{ENC}$ of the encryption keys and the stored amount $K_{DEC}$ of the decryption keys, each stored in the HDD 108, based on their respective generated amounts and consumed amounts, and also monitors the generated amount of keys generated through the above-described process of key generation (step ST601). When a new final key is generated as described above, the key management section 107 calculates a difference between the encryption and decryption keys at this point of time (step ST602) and places the new final key preferentially in the keys having the smaller stored amount (step ST603). Additionally, final keys are systematically numbered in order of generation and are stored in the HDD 108. When a final key is obtained through the process of key generation, the type and key number of the final key are notified before long from the receiver 20 through the data communication channel 50. The key management section 107 of the sender 10 determines, as a type for the currently generated final key, the other type than the receiver's type, assigns the same key number as the receiver's key number, and stores the type and key number of the final key in question in the HDD 108.

In this manner, as the quantum unit 101 continues to transmit to the quantum unit 201 a very-weak optical signal having original random number information superimposed thereon, the key generation sections 105 and 205 individually continue to generate common final keys, and the key management sections 107 and 207 continue to store the respective common keys as encryption keys/decryption keys in the HDDs 108 and 208, respectively. Meanwhile, the key management sections 107 and 207 also consume a pair of common keys as an encryption key and a decryption key every time an encrypted communication is performed.

Accordingly, if an encrypted communication occurs in one direction more frequently than in the reverse direction, the encryption and decryption keys on the sender side and on the receiver side become unequal in stored amount. Therefore, each of the key management sections 107 and 207 always monitors the stored amounts of the encryption and decryption keys, and places a generated key preferentially in the keys having the smaller stored amount, whereby such inequality in stored amount is prevented. For example, when an encrypted communication from the sender 10 to the receiver 20 occurs frequently, the stored amount of the encryption keys in the sender 10 and the stored amount of the decryption keys in the receiver 20 are respectively decreased. Accordingly, the key management section 107 of the sender 10 stores a key generated by the key generation section 105 in the HDD 108 as an encryption key, and the key management section 207 of the receiver 20 stores a key generated by the key generation section 205 in the HDD 208 as a decryption key.

Incidentally, if the stored keys in the HDDs 108 and 208 do not match when a quantum cryptographic system is booted (i.e., at the stage where a new final key is not generated yet), it can cause a problem with the key management thereafter. Accordingly, control may be performed such that, after the system is powered on, the key management section 107 of the sender 10 and the key management section 207 of the receiver 20 mutually check the oldest key numbers of the respective encryption and decryption keys through the data communication channel 50 and, if the key numbers are not identical, a key with the older number is discarded so that the stored keys on the sender side and the stored keys on the receiver side become match each other. By doing so, the contents of the stored keys in the HDDs in an initial state can be made to match. However, to make this control scheme effective, the stored keys need to be used in order of age from the oldest when an encryption key or a decryption key is used, that is, when a stored key is consumed.

Additionally, when an encryption key with the oldest number and a decryption key with the oldest number do not match between the sender 10 and the receiver 20, it is also possible that all the stored keys in the HDDs are deleted. This is effective because, by initializing the HDDs in this manner, the sender 10 and the receiver 20 can be made to match each other in a sense that no stored key is present on both sides.

Alternatively, all the stored keys in the HDDs 108 and 208 may be deleted also when the quantum cryptographic system is shut down. In this case, when the system is next booted, the contents of the stored keys in the HDDs 108 and 208 match in a sense that no stored key is present on both sides. Accordingly, in this initialization scheme, the stored keys do not need to be used in order of age from the oldest when a cryptographic key is used. However, to make it possible to use a cryptographic key in any order, before an encrypted communication is performed, the sender 10 or receiver 20 needs to inform a stored key to be used to the other end, by using a communication packet with the key number of the stored key given in the header.

In the above-described embodiment, very-weak optical pulses are transmitted by using the single quantum channel 30. However, the present invention is not limited to this but can be applied to a quantum cryptographic system using a plurality of quantum channels.

5. Various Aspects

As described before, an object of the present invention is to provide a method and system for managing shared information that enable communication devices to use identical information.

Another object of the present invention is to provide a communications system that realizes stable encrypted communications by allowing communication devices to share and manage key information that is synchronously generated.

According to the present invention, communication devices individually generate shared information, and communication between the communication devices is performed so that the communication devices are enabled to make an association between the same pieces of the shared information. Accordingly, the communication devices, only by themselves, without a third party, can always match their respective pieces of the shared information. Especially in the case where the shared information continues to be generated as well as consumed such that the information once used will never be used again, the stored amount of shared information varies at all times. In such a case, according the present invention, the shared information is associated between the communication devices, allowing the communication devices to use identical information. Accordingly, in the case of using one-time pad encryption, stable encryption communication can be achieved.

It is assumed that the communication system is shut down with the associated information shared between the communication devices remaining in each communication device. In this case, when the system starts up, the remaining shared information does not always match each other between the communication devices. According to the present invention, it is checked whether the shared information is associated with each other between the communication devices. If not associated, the shared information in each communication device is deleted in part or may be deleted in entirety. Alternatively, when the system is shut down, all the remaining shared information in the communication devices can be deleted, ensuring that the shared information matches each other when starting up.

In a system in which the same key (shared information) is used as encryption key and decryption key for sending side and receiving side, it is necessary to match a key to be used in both sides. Especially, in a system in which the key once used is discarded, it is preferable that the encryption key and decryption key are separately managed while associating the shared information with the other communication devices.

Moreover, in order to avoid causing one of the encryption key and the decryption key to run out, stored amounts of the encryption key and the decryption key in each communication device are monitored and newly generated keys are preferentially given to which one of the encryption and decryption keys has a smaller stored amount.

According to an exemplary embodiment of the present invention, one communication device transmits original information to the other communication device according to a predetermined timing (e.g. in units of a frame). Based on information which is successfully received by the other communication device, information shared between the communication devices is sequentially generated in units of a predetermined size (e.g. in units of a file) and is stored in a first memory. Accordingly, the generation processing of the shared information is sequentially performed according to frame timing, resulting in approximately simultaneous and sequential generation of the shared information in files at both of the communication devices.

The shared information thus generated in files is associated between the communication devices and is stored in a second memory. Accordingly, the communication devices, only by themselves, without a third party, can always match their respective pieces of the shared information.

In the above exemplary embodiment, one communication device continues to transmit original information to the other communication device, which causes the communication devices to sequentially accumulate the associated pieces of shared information in units of a file into the second memory. Accordingly, even in the case where the associated pieces of shared information are sequentially consumed as encryption/decryption key, the accumulated amount of shared information in the second memory is monitored in real time, which avoids causing one of the encryption key and the decryption key to run out at each communication device.

As described above, according to the present invention, communication devices individually generate shared information, and one of the communication devices notifies the other communication device of information for specifying one piece of the shared information, whereby the communication devices make an association between the same pieces of the shared information. Accordingly, the communication devices, only by themselves, without a third party, can always match their respective versions of the shared information.

For example, in a system such as a QKD system in which a sender and a receiver generate cryptographic keys independently of each other, the cryptographic keys, which are generated by the sender and by the receiver substantially at the same time, are ensured to be identical random number sequences. The cryptographic keys thus generated are subjected to the above-described association-based sharing processing, whereby cryptographic key sharing between the sender and the receiver is realized. Thus, it is possible to perform stable encrypted communications.

Moreover, the sender and the receiver can effectively perform the encryption/decryption key sharing processing by each always monitoring the generated amounts, used amounts, and stored amounts of the encryption and decryption keys. Thus, it is possible to provide stable encrypted communications.

Furthermore, according to the present invention, each communication device monitors the stored amounts of the encryption keys and of the decryption keys, and places a newly generated key preferentially in the keys having the smaller stored amount, whereby each communication device can prevent running up either the encryption keys or the decryption keys. Thus, it is possible to perform stable encrypted communications.

The present invention is applicable to cryptographic systems in general in which a sender and a receiver perform computing and cryptographic key generation and management independently of each other, regardless of the type of quantum key distribution scheme.

The present invention may be embodied in other specific forms without departing from the spirit or essential characteristics thereof. The above-described exemplary embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A method for managing shared information which is generated between first and second communication devices in a communication system, comprising:
   generating the shared information at each of the first and second communication devices;
   transmitting identifying information from the first communication device to the second communication device, wherein the identifying information identifies a piece of the shared information generated in the first communication device;

making an association between same pieces of the shared information generated at respective ones of the first and second communication devices based on the identifying information; and storing associated pieces of the shared information at respective ones of the first and second communication devices, wherein the shared information is generated at each of the first and second communication devices by:

transmitting original information in first data processing units from one of the first and second communication devices to the other communication device by using a low power channel and a normal power channel that defines beginning and ending points of separate frames of the original information being transmitted; and generating the shared information in second data processing units at each of the first and second communication devices based on information which was received in the first data processing units by the other communication device by using a normal power channel, wherein the shared information in the second data processing units is stored in a first storage section, wherein the associated pieces of the shared information at respective ones of the first and second communication devices are stored in a second storage section.

2. The method according to claim 1, further comprising:
when a communication is performed between the first and second communication devices, consuming at least one associated piece of the shared information stored at each of the first and second communication devices.

3. The method according to claim 2, further comprising:
managing a stored amount of the shared information based on generated amount and consumed amount of the shared information at each of the first and second communication devices.

4. The method according to claim 1, wherein when the communication system starts up, one of the first and second communication devices determines whether a piece of the shared information is associated with that of the other communication device.

5. The method according to claim 1, wherein when the communication system is shut down, the shared information stored in each of the first and second communication devices is entirely deleted.

6. The method according to claim 1, wherein one of the first and second communication devices notifies the other that an associated piece of the shared information is used as a selected one of an encryption key and a decryption key, whereby the piece of the shared information is used as the encryption key at the one and as the decryption key at the other.

7. The method according to claim 6, wherein an encryption key and a decryption key are separately managed at each of the first and second communication devices.

8. The method according to claim 7, wherein at each of the first and second communication devices,
monitoring stored amounts of respective ones of the encryption key and the decryption key; and
providing a newly generated piece of the shared information preferentially in which one of the encryption and decryption keys has a smaller stored amount.

9. The method according to claim 8, wherein at each of the first and second communication devices, the piece of the shared information once used as the encryption key or the decryption key is never used again.

10. The method according to claim 1, wherein one of the first and second communication devices notifies the other that an associated piece of the shared information is used as a selected one of an encryption key and a decryption key, whereby the piece of the shared information is used as the encryption key at the one and as the decryption key at the other.

11. The method according to claim 10, wherein an encryption key and a decryption key are separately managed at each of the first and second communication devices.

12. The method according to claim 11, wherein at each of the first and second communication devices,
monitoring stored amounts of respective ones of the encryption key and the decryption key; and
providing a newly generated piece of the shared information preferentially in which one of the encryption and decryption keys has a smaller stored amount.

13. The method according to claim 12, wherein at each of the first and second communication devices, the shared information is used in the second data processing units for one-time pad encryption.

14. A system for managing shared information which is shared between communication devices in a communication system, wherein each of the communication devices comprises:
a shared information generator for generating the shared information;
a memory for storing the shared information;
a manager for communicating identifying information with another communication device to make an association with same piece of the shared information generated in the other communication device, wherein the identifying information identifies said piece of the shared information; and
a storage section for storing associated pieces of the shared information,
wherein the shared information is generated at each of the communication devices by:
original information being transmitted in first data processing units from one of the communication devices to the other communication device by using a low power channel and a normal power channel that defines beginning and ending points of separate frames of the original information being transmitted; and
the shared information being generated in second data processing units at each of the communication devices based on information which was received in the first data processing units by the other communication device by using a normal power channel, wherein the shared information in the second data processing units is stored in the storage section of the other communication device,
wherein the associated pieces of the shared information at respective ones of the communication devices are stored in the respective storage sections of the communication devices.

15. The system according to claim 14, wherein when communicating with the other communication device, the manager consumes at least one associated piece of the shared information stored in the storage section.

16. The system according to claim 15, wherein the manager manages a stored amount of the shared information based on generated amount and consumed amount of the shared information stored in the storage section.

17. The system according to claim 14, wherein one of the communication devices notifies the other that an associated piece of the shared information is used as a selected one of an encryption key and a decryption key, whereby the piece of the shared information is used as the encryption key at the one and as the decryption key at the other.

18. The system according to claim 17, wherein an encryption key and a decryption key are separately managed at each of the communication devices.

19. The system according to claim 18, wherein the manager monitors stored amounts of respective ones of the encryption key and the decryption key, and provides a newly generated piece of the shared information preferentially in which one of the encryption and decryption keys has a smaller stored amount.

20. The system according to claim 19, wherein the manager never uses again the piece of the shared information once used as the encryption key or the decryption key.

21. A communication device for managing shared information which is shared with another communication device, comprising:
 a shared information generator for generating the shared information;
 a memory for storing the shared information;
 a manager for communicating identifying information with another communication device to make an association with same piece of the shared information generated in the other communication device, wherein the identifying information identifies said piece of the shared information, the identifying information indicating which bits of a plurality of bits of the shared information were successfully received over a low power channel; and
 a storage section for storing associated pieces of the shared information, the associated pieces of the shared information including bit levels of a plurality of bits of the shared information that were not successfully received over the low power channel and that are sent over a normal power channel.

22. A computer readable medium storing a program for instructing a computer to manage shared information which is shared with another communication device, comprising:
 storing the shared information in a memory;
 communicating identifying information with another communication device through a communication section to make an association with same piece of the shared information generated in the other communication device, wherein the identifying information identifies said piece of the shared information, the identifying information indicating which bits of a plurality of bits of the shared information were successfully received over a low power channel; and
 storing associated pieces of the shared information in a storage section, the associated pieces of the shared information including bit levels of a plurality of bits of the shared information that were not successfully received over the low power channel and that are sent over a normal power channel.

23. A communication system for secret communication between first and second communication devices, wherein
 the first communication device comprises:
  a first generator for generating secret information to be shared with the second communication device;
  a first memory for storing the secret information;
  a first manager for transmitting identifying information to the second communication device to make an association with same piece of the secret information generated in the second communication device, wherein the identifying information identifies said piece of the secret information; and
  a first storage section for storing associated pieces of the secret information, and
 the second communication device comprises:
  a second generator for generating the secret information to be shared with the second communication device;
  a second memory for storing the secret information;
  a second manager for using the identifying information received from the first communication device to make an association with the same piece of the secret information generated in the first communication device, the identifying information indicating which bits of a plurality of bits of the shared information were successfully received over a low power channel; and
  a second storage section for storing associated pieces of the secret information, the associated pieces of the secret information including bit levels of a plurality of bits of the shared information that were not successfully received over the low power channel and that are sent over a normal power channel.

* * * * *